United States Patent [19]
Van Den Goor

[11] Patent Number: 5,435,429
[45] Date of Patent: Jul. 25, 1995

[54] CONVEYOR

[75] Inventor: Jakobus M. Van Den Goor, Eindhoven, Netherlands

[73] Assignee: Vanderlande Industries Nederland B.V., Veghel, Netherlands

[21] Appl. No.: 250,612

[22] Filed: May 27, 1994

[30] Foreign Application Priority Data

May 27, 1993 [NL] Netherlands ............... 9300908

[51] Int. Cl.⁶ ............................................. B65G 47/46
[52] U.S. Cl. ......................... 198/890.1; 198/477.1; 198/703
[58] Field of Search ............... 198/365, 477.1, 703, 198/704

[56] References Cited

U.S. PATENT DOCUMENTS

| | | | |
|---|---|---|---|
| 1,926,914 | 9/1933 | Popov | 198/704 |
| 3,231,068 | 1/1966 | Harrison et al. | 198/365 |
| 3,318,435 | 5/1967 | Scott | 198/365 |
| 3,361,247 | 1/1968 | Lauzon et al. | 198/365 |
| 3,550,748 | 12/1970 | Hauer | 198/365 |
| 4,492,509 | 1/1985 | Divoux et al. | 198/704 |

Primary Examiner—Joseph E. Valenza
Attorney, Agent, or Firm—Oblon, Spivak, McClelland, Maier & Neustadt

[57] ABSTRACT

The invention relates to a conveyor provided with a frame and with at least one carrier guided by a guide mechanism, which can be moved in the longitudinal direction of the conveyor by a driving mechanism. At least some of the carriers support sliding pieces, which can be moved with respect to the carriers in question by a control mechanism, in a direction transversely to the intended direction of movement of the carriers during operation, so as to move objects to be transported with the conveyor during operation. The carriers are guided by a single elongated guide mechanism, while a sliding piece is provided with a receptacle which is open at its bottom side. The sliding piece is movable with respect to a carrier(s), between a first position, in which the receptacle is closed by a closing mechanism connected to a carrier(s), and a second position, in which the receptacle in the sliding piece is located beside the closing mechanism and beside the guide mechanism.

14 Claims, 5 Drawing Sheets

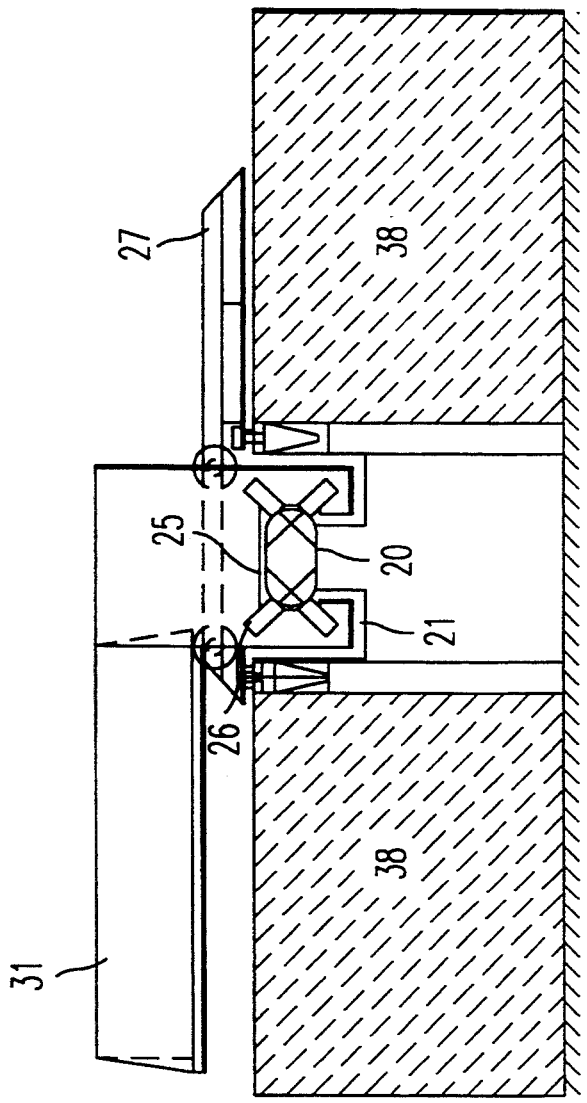
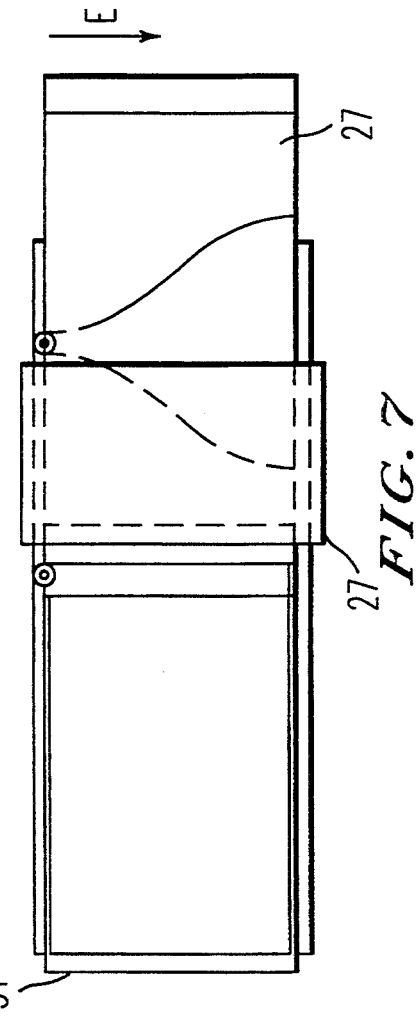
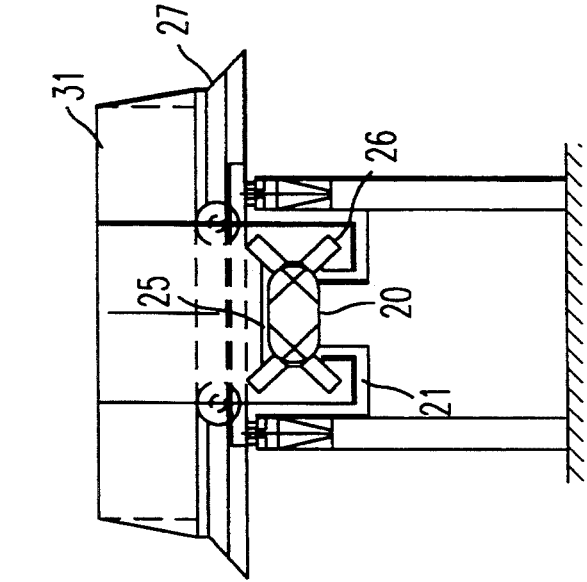
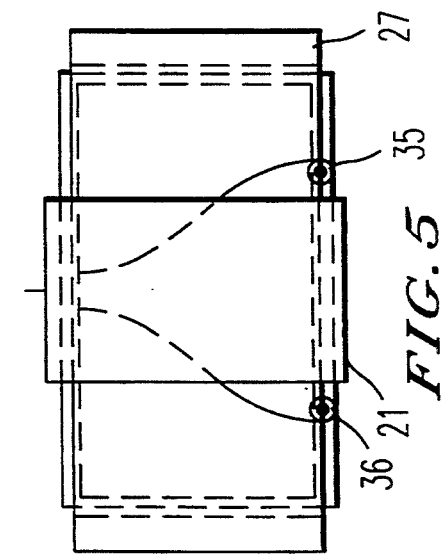

CONVEYOR

BACKGROUND OF THE INVENTION

1. Field of the Invention

The invention relates to a conveyor provided with a frame and with carriers guided by guide means, which can be moved in the longitudinal direction of the conveyor by driving means, whereby at least some of the carriers support sliding pieces, which can be moved with respect to the respective carriers by control means, in a direction transversely to the intended direction of movement of the carriers during operation, so as to move objects to be transported with the conveyor during operation.

2. Discussion of the Background

Conveyors of this kind are for example known from U.S. Pat. No. 3,361,247, FR-A-2,388,737 and GB-A-2,057,381.

These conveyors are intended to move objects which are supplied in one or more supply stations to destination stations, which generally comprise discharge means, such as conveyor belts, chutes or the like, which are disposed near one side of the conveyor. The objects are usually provided with codes, which are read and processed in an electronic control device, by means of which the sliding pieces are moved with respect to the carriers at desired points of time, in such a manner that each object is delivered from the conveyor to a desired destination station in the respective destination station.

With these devices the objects to be transported are directly supported on the carriers and they are pushed off the carriers near a selected destination station by means of the sliding pieces, whereby the sliding pieces in question engage the sides of the objects. In particular with the high conveying velocities that are aimed at these known devices are generally not suitable for moving for example small, light objects, round objects and the like, since these objects usually move from the position relative to the carriers in which they were placed onto the conveyor while being moved by means of the conveyor, and consequently will not be pushed off the conveyor by the sliding pieces in the correct destination station.

Furthermore a device for treating foodstuffs is known from NL-A-8802813, which device is provided with a conveyor belt built up of a plurality of plate-shaped parts, which are pivotally interconnected by means of pivot pins extending perpendicularly to the longitudinal direction of the conveyor belt.

Recesses for receiving foodstuffs to be treated are provided in said plate-shaped parts in side-by-side relationship. Furthermore slides are provided under said plate-shaped parts, which can be moved parallel to said pivot pins at desired places, between a position in which the slides close the openings in the plate-shaped parts and a position in which the slides release the openings in the plate-shaped parts, so that the products present in the openings can fall into containers disposed under the conveyor belt. Said containers are moved under the conveyor belt, transversely to the longitudinal direction of the conveyor belt, in a first station, then move some distance along with the conveyor belt in order to receive the objects to be introduced into the containers, after which the containers are moved from their position under the conveyor belt again, transversely to the direction of displacement of the conveyor. This device has a complicated construction, as a result of which it is unsuitable for delivering a selected object in a selected destination station of a number of destination stations arranged one behind the other, seen in the direction of displacement of the conveyor.

SUMMARY OF THE INVENTION

The object of the invention is to obtain a conveyor of the above kind, which is suitable for conveying small and/or light and/or round objects and the like, in such a manner, that each of said objects can be accurately delivered in a selected destination station.

According to a first aspect of the invention this can be achieved in that said carriers are guided by a single elongated guide means, while a sliding piece is provided with a receptacle, which is open at its bottom side, and is movable with respect to said carrier(s) between a first position, in which the receptacle is closed by a closing means connected to a said carrier(s), and a second position, in which said receptacle in the sliding piece is located beside the closing means and beside the guide means.

At the discharge stations the objects will fall from the receptacles, for example onto a conveyor belt, chute or the like connecting to one side of the conveyor at the discharge station. Since the carriers are thereby supported by a single guide means, there is sufficient room near the side of the conveyor to obtain a connection to the discharge stations in a compact manner.

According to a second aspect of the invention a sliding piece is provided with a receptacle for receiving at least one object, while said sliding piece is movable from a central position in two opposite directions with respect to the carrier.

When a device of this type is used, small objects can be supplied to the sliding piece, which is in its central position, at a supply station, and be discharged from the receptacle in the sliding piece in a discharge station positioned at the one or the other side of the conveyor, as desired. Thus a device can be obtained by means of which also small objects and the like can be handled in large numbers per time unit in a very accurate and quick manner. At the discharge stations the objects may be taken from the receptacles, for example by gripping means, suction means or the like. Preferably, however, the sliding piece is also in this case provided with a receptacle which is open at its bottom side, so that the objects can move out of the receptacles at the discharge stations under the influence of gravity.

BRIEF DESCRIPTION OF THE DRAWINGS

The invention will be explained in more detail hereafter with reference to an embodiment of the construction according to the invention diagrammatically illustrated in the accompanying Figures.

FIG. 4 is a diagrammatic cross-section of a further embodiment of a conveyor according to the invention.

FIG. 5 is a bottom view of FIG. 4.

FIG. 6 is a cross-sectional view corresponding with FIG. 4, wherein the sliding piece is illustrated in a position for delivering an object in a destination station.

FIG. 7 is a bottom view of FIG. 6.

DESCRIPTION OF THE PREFERRED EMBODIMENTS

Figure 1:
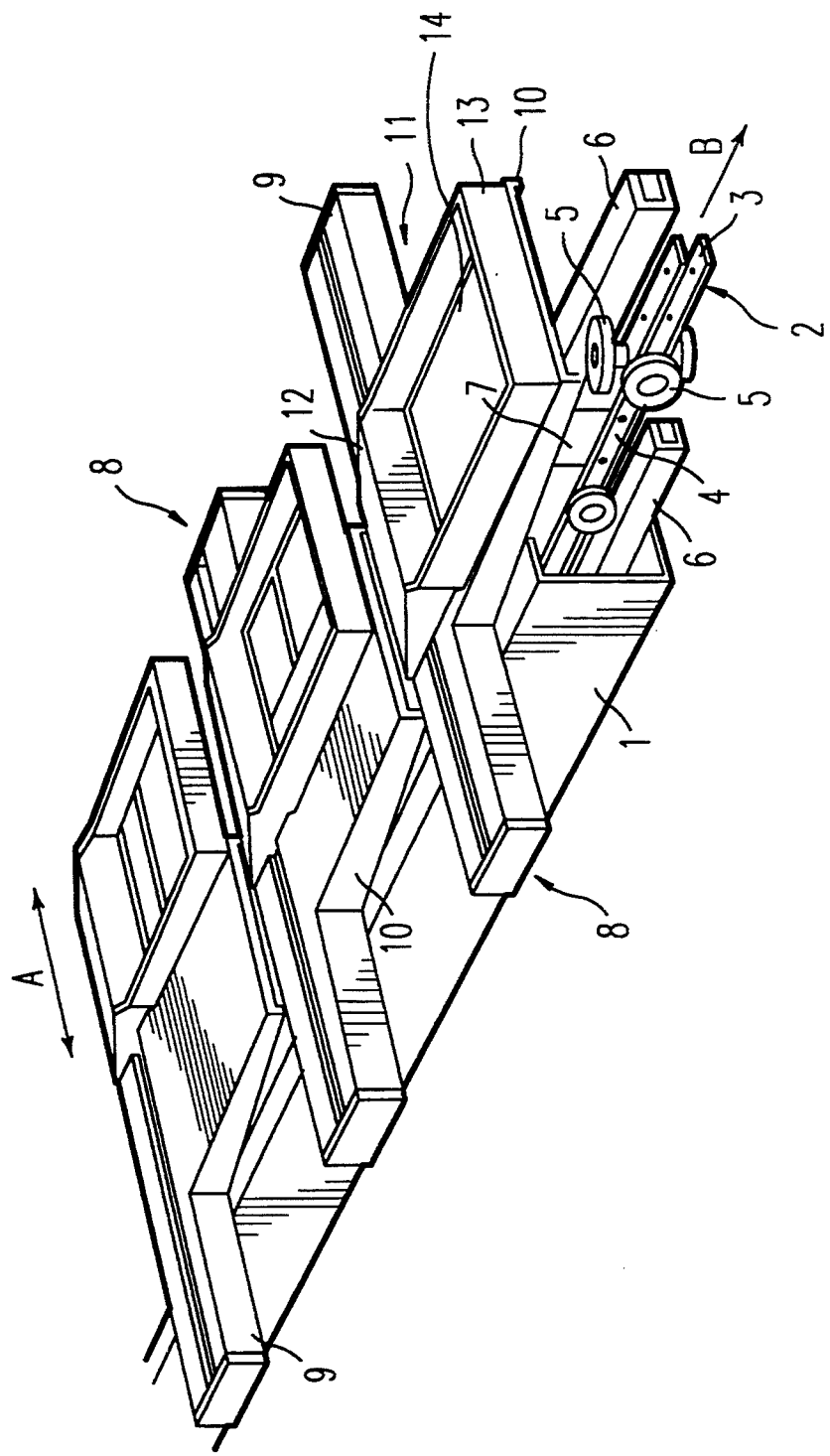
FIG. 1 is a diagrammatic, perspective view of a part of a conveyor according to the invention.

As is shown in FIG. 1 the conveyor comprises a frame 1, in which a driving means 2 in the shape of a conveyor chain is guided. The conveyor chain is provided with links 3 and 4 respectively, which are pivotable about horizontal and vertical pivot axes with respect to each other. Guide wheels 5, which are rotatable about horizontal and vertical axes, are connected to the conveyor chain 2 at a point near the pivot axes, said guide wheels co-operating with guide rails 6 accommodated within the frame 1 of the conveyor. The construction of such a driving means or conveyor chain is for example described in Dutch Patent Application No. 8900974.

Carriers 8 are secured to at least a number of the links 3 and/or 4 by means of upwardly extending supports 7. In the illustrated embodiment the carriers have a substantially T-shaped configuration, when seen in plan view, whereby they are made up of a beam 9 extending transversely to the longitudinal direction of the conveyor chain 2 and a platform 10 joining the centre of the beam.

A sliding piece 11 is movable along the carrier 8, transversely to the longitudinal direction of the conveyor chain 2 (arrow A).

The sliding piece 11 comprises a coupling piece 12, by means of which the sliding piece 11 is movably coupled to the beam 9, and furthermore a frame-like part 13, which bounds a receptacle 14 which is open at its upper side and its bottom side. Dependent on the objects to be conveyed it will not always be necessary for the receptacle to be closed on all sides.

Figure 2:
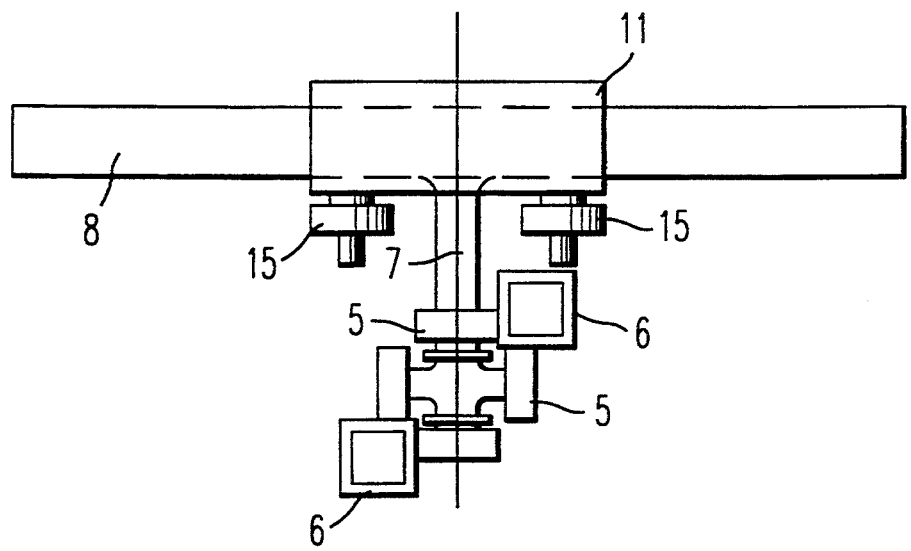
FIG. 2 is a diagrammatic view of a carrier and a sliding piece, which can be moved along said carrier.

As will be apparent from FIG. 1, the size of the frame 13 bounding the receptacle 14 is adapted to the size of the platform 10, so that the receptacle 14 is closed by the platform 10 at its bottom side when the sliding piece 11 is positioned near the center of the carrier 8. As is diagrammatically indicated in FIGS. 2 and 3, two guide wheels 15 are secured to the bottom side of the coupling piece 12 positioned under the beam 9, said guide wheels being freely rotatable about axes of rotation extending perpendicularly to the beam 9.

Figure 3:
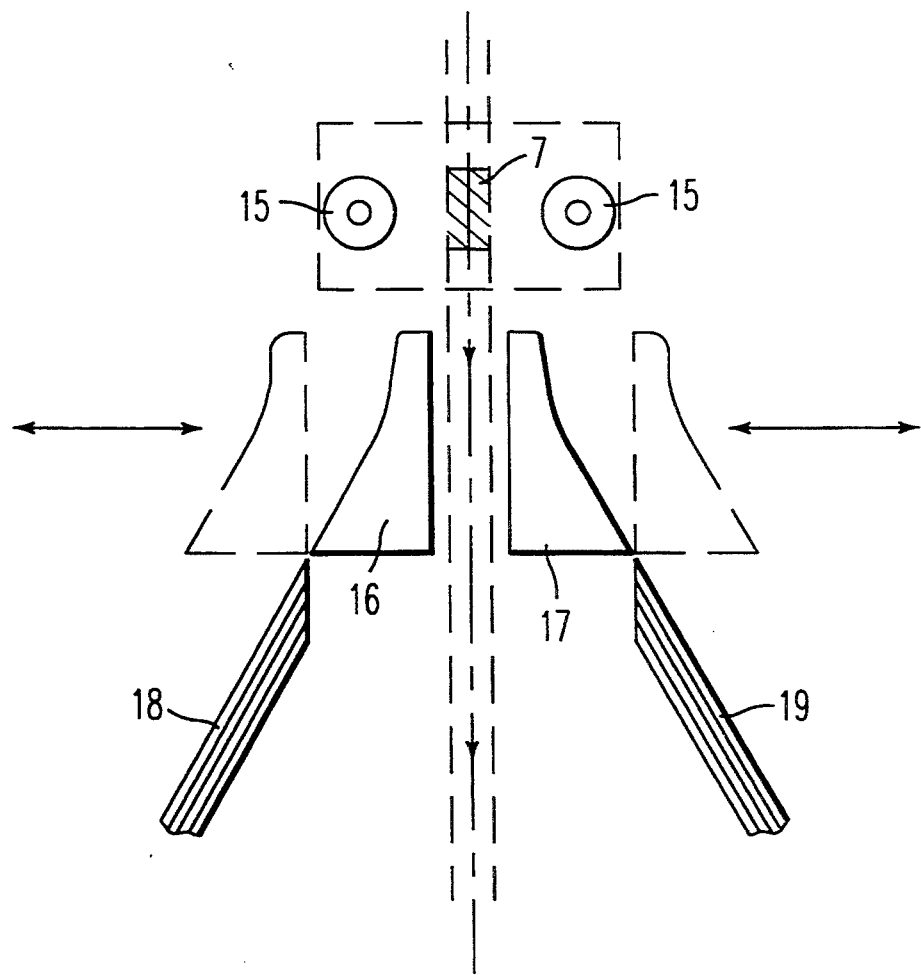
FIG. 3 is a diagrammatic plan view of a switch station, in which means are disposed for moving the sliding piece with respect to the carrier.

Two switch pieces 16 and 17 are disposed near a switch station, which is diagrammatically indicated in FIG. 3, said switch pieces each being adjustable, by setting means not shown, between the position illustrated in full lines in FIG. 3 and the position illustrated in dotted lines in FIG. 3. Guide rails 18 and 19 respectively, which extend obliquely to the direction of movement of the chain, are disposed downstream of said switch pieces, seen in the intended direction of movement of the conveyor chain 2 according to arrow B.

It will be apparent that when a carrier with a sliding piece connected thereto passes the switch station shown in FIG. 3. While the two switch pieces 16 and 17 are in the position illustrated in dotted lines in FIG. 3, the guide wheels 15 can pass the switch station without impediment and the sliding piece 11 will thus not be moved relative to the carrier 8.

When the switch piece 16 has for example been moved to the position illustrated in full lines, however, the left-hand (seen in FIGS. 2 and 3) guide wheel 15 will come into contact with the left-hand (seen in FIG. 3) guide face of the switch piece 16 and start to move along said guide face and along the rail 18, which will cause the sliding piece 11 to move towards the left with respect to the carrier 8.

In a similar manner the sliding piece 11 will move towards the right along the carrier 8 when instead of the switch piece 16 the switch piece 17 is moved to the position shown in full lines in FIG. 3.

During operation of the above-described conveyor, objects to be moved may be supplied in a certain supply station, along which the carriers and the sliding pieces connected thereto are passed, while the sliding pieces are positioned in such a manner, that the frame-like parts 13 are located above the platforms 10. The supply of objects may for example take place via a chute or the like. One or more objects may thereby be placed in each receptacle 14 as desired.

The objects supplied may be delivered at a desired station by moving the sliding piece in the above-described manner with respect to the respective carrier, whereby the receptacle 14 will come to lie beside the platform 10, and an object present within the receptacle 14 can fall through the open bottom side of the receptacle, where said object may be caught by means of a chute or the like (not shown).

Then the shifted sliding pieces may be returned to their central position by guide means (not shown) which are known per se, before being passed along the supply station again so as to receive objects to be moved.

Of course variations and/or additions to the construction described above and illustrated in the Figures are conceivable.

When it is for example only necessary to discharge objects on one side of the conveyor, it will be possible to use L-shaped carriers instead of the T-shaped carriers that are shown in FIG. 1. Furthermore it is possible, of course, to adapt the shape of the receptacle to the shape of the objects to be moved, if desired.

The conveyor shown in FIGS. 4–9 comprises a guide means 20 in the shape of a rail for carriers 21 which are movable along said guide rail 20. As is apparent more in particular from FIGS. 8 and 9, a carrier 21 is substantially U-shaped, with two legs 22 and 23 extending perpendicularly to the longitudinal direction of the guide rail 20 and a web 24 extending in the longitudinal direction of the guide rail 20, which connects said legs. A passage 25 extending in the longitudinal direction of the web 24 is provided in said web, through which the guide rail 20 extends. Four guide wheels 26 supported by the carrier 21 are near each of the two ends of the passage 25, said guide wheels supporting the carrier on the guide rail 20, as will be apparent in particular from FIGS. 4, 6 and 8.

In order to achieve a satisfactory guiding along the rail 20 one of the wheels 26 present at the bottom side of the rail 20 is biased against the rail by means of a spring element at one end of the passage 25, while at the other end of the passage 25 both wheels 26 present at the bottom side of the rail 20 are biased against the rail 20 with spring elements.

For their movement along the guide rail 20 the carriers 21 may for example be interconnected by means of a transport chain of the type described above. Another possibility is for example to provide each carrier 21 with a driving motor, by means of which at least one of the wheels 26 can be driven.

Figure 8:
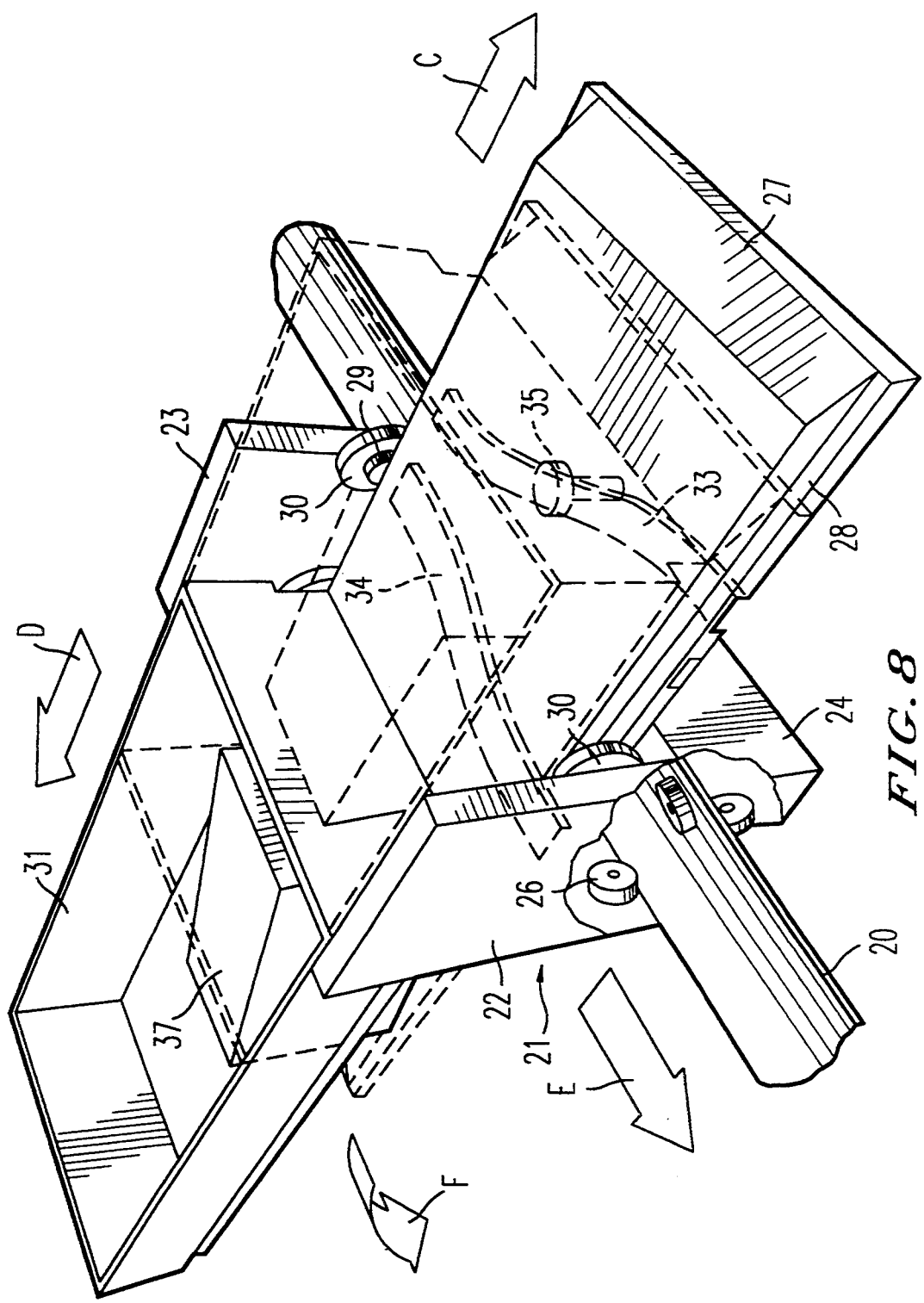
FIG. 8 is a perspective view of a carrier with a sliding piece connected thereto of the device shown in FIGS. 4–7, seen at an angle from above.

Each carrier 21 supports a bottom plate 27 located between the legs 22 and 23 of the carrier, in such a manner that said bottom plate can be moved from a central position illustrated in full lines in FIGS. 4 and 5 and in dotted lines in FIG. 8, transversely to the longitudinal direction of the guide rail 20, both in the direction according to the arrow C and in the direction according to the arrow D.

Racks 28 extending in the longitudinal direction of the bottom plate are mounted on the sides of the bottom plate.

Each of the legs 22 and 23 supports two spaced-apart pinions 29, in such a manner that said pinions 29 are freely rotatable about axes of rotation extending parallel to the longitudinal direction of the guide rail 20. The pinions 29 are thereby in engagement with the racks 28. Furthermore said pinions 29 are integral with pinions 30, which have a larger diameter than the pinions 29.

A sliding piece 31 in the shape of a rectangular bin which is open at its upper side and bottom side is arranged above the bottom plate. Said sliding piece 31 is likewise supported by the carrier 21, in such a manner that said sliding piece can move from a central position illustrated in full lines in FIGS. 4 and 5 and in dotted lines in FIG. 8 both in the direction according to the arrow C and in the direction according to the arrow D. The sliding piece is on both sides provided with racks 32 extending in the longitudinal direction of the sliding piece, with which the pinions 30 are in engagement.

Two guide means in the shape of guide grooves 33 and 34 are provided in the bottom side of the bottom plate 29. As will be apparent in particular from FIG. 8, the longitudinal axes of the curved grooves 33 and 34 include an angle with the longitudinal axis of the guide rail 20, whilst the distance between the guide grooves gradually decreases in a direction opposed to the intended direction of movement of the carriers according to the arrow E. The front ends of the grooves 33 and 34 are thereby positioned on either side of the guide rail 20 in the central position of the bottom plate.

A guide cam or guide roller 35 co-operating with the guide groove 33 and/or a guide cam or guide wheel 36 co-operating with the guide groove 34 is arranged near each destination station in which an object must possibly be delivered. The guide wheels 35 and 36 can be moved upwards, by setting means not shown, from a lowermost position, in which the bottom plates can move over the respective guide wheels 35 and 36 without touching them, so that either the guide roller 35 engages the guide groove 33 or the guide roller 36 engages the guide groove 34.

Figure 9:
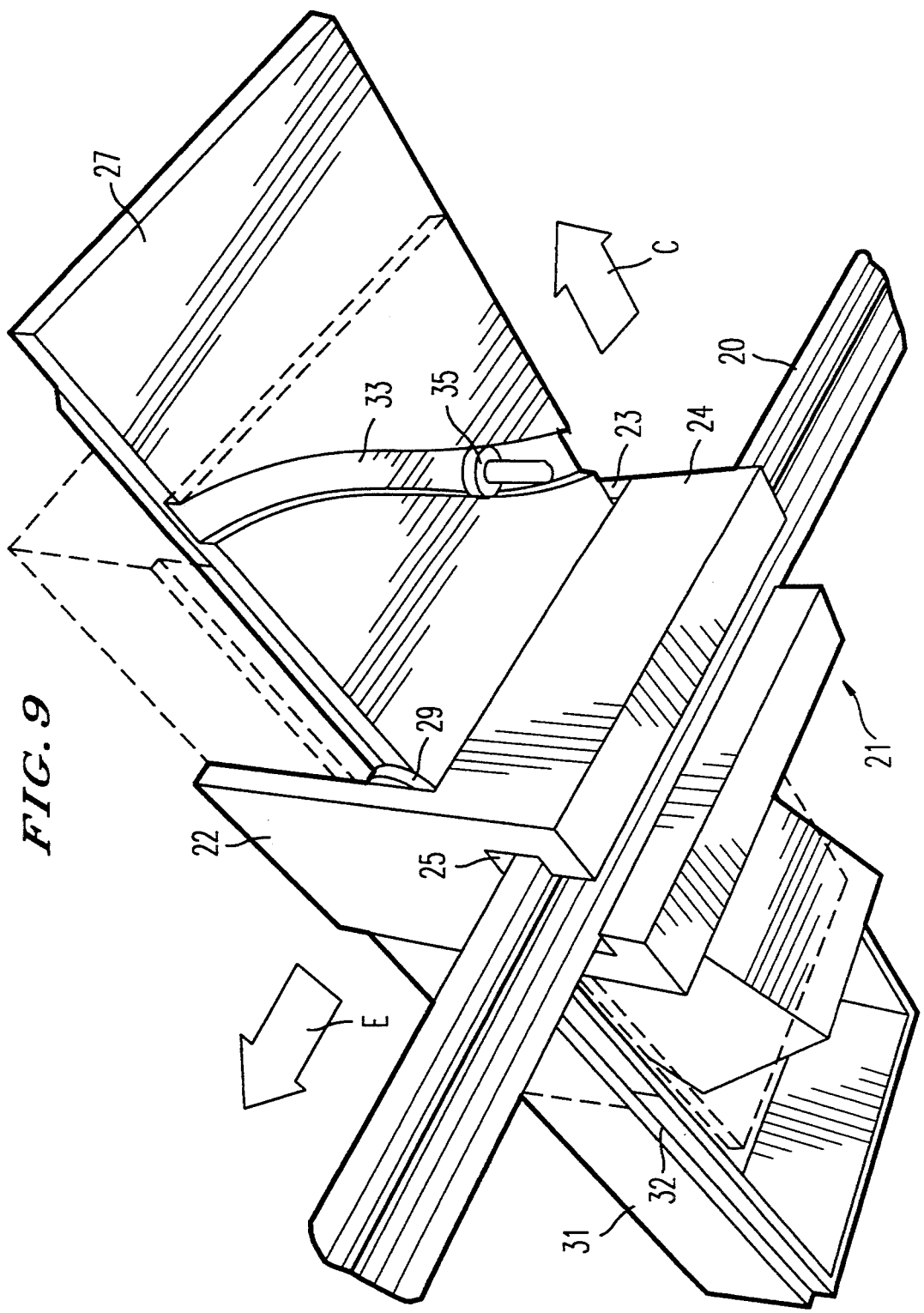
FIG. 9 is a perspective view of the carrier and the sliding piece shown in FIG. 8, seen at an angle from below.

If the guide roller 35 comes into engagement with the guide groove 33, as is shown in FIGS. 8 and 9, the bottom plate will be moved in the direction according to the arrow C. Movement of the bottom plate in the direction according to the arrow C will cause the pinions 29 and the pinions 30 secured to the pinions 29 to rotate. Rotation of the pinions 30 will cause the slide 31 to move in the direction according to the arrow D. Since the pinion 29 has a smaller diameter than the pinion 30, the slide will be moved in the direction according to the arrow D over a greater distance than the bottom plate 27 is moved in the direction according to the arrow C. It will be apparent, that in this manner an object 37 present within the slide 31, which is supported by the bottom plate in the central position of the bottom plate and the slide 31, is moved in the direction according to the arrow D, seen in FIG. 8, and may subsequently fall out of the slide 31 in the direction according to the arrow F. The object falling out of the slide in this manner may be caught in the destination station, for example by further transport means 38 or the like diagrammatically indicated in FIG. 6.

Furthermore it will be apparent that, because the bottom plate is moved in a direction opposite to the slide in a destination station, the bottom side of the slide may be completely opened when the slide takes up a position close to the frame of the conveyor, so that it is possible to obtain a compact construction of the installation made up of the conveyor and the destination stations connecting thereto.

The configuration of the guide grooves has been selected such that when the bottom plate 27 moves in one direction the slide 31 will evenly move in the opposite direction, without any sudden changes as regards place, speed and/or acceleration.

I claim:

1. A conveyor provided with a frame and with at least one carrier guided by a guide means, which can be moved in a longitudinal direction of the conveyor by driving means, whereby at least some of the carriers support sliding pieces, which can be moved with respect to said carriers by control means, in a direction transversely to an intended direction of movement of the carriers during operation, so as to move objects to be transported with the conveyor during operation, wherein said carriers are guided by a single elongated guide means, while a sliding piece is provided with a receptacle, which is open at its bottom side, and is movable with respect to said carriers, between a first position, in which the receptacle is closed by a closing means connected to at least one of said carriers, and a second position, in which said receptacle in the sliding piece is located beside the closing means and beside the guide means.

2. A conveyor according to claim 1, wherein said sliding piece is movable from said first position to said second position in two opposite directions.

3. A conveyor provided with a frame and with carriers guided by guide means, which can be moved in a longitudinal direction of the conveyor by driving means, whereby at least some of the carriers support sliding pieces, which can be moved with respect to said carriers by control means, in a direction transversely to an intended direction of movement of the carriers during operation, so as to move objects to be transported with the conveyor during operation, wherein said sliding piece is provided with a receptacle for receiving at least one object, while said sliding piece is movable from a central position in two opposite directions with respect to the carrier, said receptacle comprising interconnecting upstanding wall means which define a space for accommodating said at least one object.

4. A conveyor according to claim 3, wherein said receptacle of said sliding piece is open at its bottom side and is closed by a closing means in said central position.

5. A conveyor according to one of claims 1 or 3, wherein said sliding piece co-operates with an at least substantially T-shaped carrier, which is provided with a beam, along which a coupling piece is movable, and with a platform, which closes said receptacle at its bottom side in said first position.

6. A conveyor according to one of claims 1 or 3, wherein the sliding piece co-operates with an L-shaped carrier, which is provided with a beam, along which a coupling piece connected to said sliding piece is movable, and with a platform, which can close an open bottom of said receptacle.

7. A conveyor according to one of claims 1 or 3, wherein said carrier supports a bottom plate and said sliding piece, whereby said bottom plate and said sliding piece are movable in opposite directions with respect to each other, from a first position, in which said sliding piece is positioned above the bottom plate closing said sliding piece at its bottom side, to a second position, in which said sliding piece is at least partly positioned beside said bottom plate.

8. A conveyor according to claim 7, wherein said bottom plate and said sliding piece are each movable from a central position in two opposite directions.

9. A conveyor according to claim 7, wherein said bottom plate and said sliding piece are provided with racks, which are in engagement with pinions positioned between said racks and being rotatably supported by the carrier.

10. A conveyor according to claim 7, wherein a first pinion is in engagement with a rack provided on said bottom plate, and a second pinion fixedly connected to said first pinion, which has a larger diameter than said first pinion, and is in engagement with a rack provided on said sliding piece.

11. A conveyor according to claim 7, wherein said bottom plate is provided with at least one elongated guide means, which includes an angle with the intended direction of movement of said carrier, and with a guide cam connected to the frame of the conveyor, which can be moved into and out of the path of movement of said guide means.

12. A conveyor according to claim 11, wherein two guide means extending at an angle with respect to the intended direction of movement of the carrier and guide cams co-operating therewith are provided.

13. A conveyor according to claim 11, wherein the guide means is made up of a groove provided in the bottom side of said bottom plate.

14. A conveyor according to claim 7, wherein the carrier is made up of a U-shaped frame part, whereby said bottom plate and said sliding piece are positioned between legs of the U and whereby a recess for receiving a guide rail extending in the intended direction of movement of said carriers is provided in a web connecting the legs.

* * * * *